(12) United States Patent
Nosaka (10) Patent No.: US 9,189,685 B2
(45) Date of Patent: Nov. 17, 2015

(54) OBJECT DETECTION DEVICE (75) Inventor: Kenichiro Nosaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 318 days.

(21) Appl. No.: 14/001,573

(22) PCT Filed: Mar. 14, 2012

(86) PCT No.: PCT/IB2012/000476
§ 371 (c)(1),
(2), (4) Date: Aug. 26, 2013

(87) PCT Pub. No.: WO2012/123808
PCT Pub. Date: Sep. 20, 2012

(65) Prior Publication Data
US 2013/0329959 A1 Dec. 12, 2013

(30) Foreign Application Priority Data
Mar. 17, 2011 (JP) .................. 2011-059699

(51) Int. Cl.
G06T 7/00 (2006.01)
G06K 9/00 (2006.01)
(Continued)

(52) U.S. Cl.
CPC ............ *G06K 9/00369* (2013.01); *G01S 3/783* (2013.01); *G06T 7/0081* (2013.01);
(Continued)

(58) Field of Classification Search
CPC ............... G01S 3/783; G06K 9/00369; G06K 2209/21; G01V 8/10; G01V 9/005; G06T 7/0081; G06T 7/0097; G06T 2207/10048; G06T 7/20144; G06T 7/20224
See application file for complete search history.

(56) References Cited

U.S. PATENT DOCUMENTS 7,415,164 B2* 8/2008 Wren et al. .................... 382/280
7,693,331 B2* 4/2010 Porikli et al. ................. 382/174
(Continued)

FOREIGN PATENT DOCUMENTS

EP 0 755 034 1/1997
JP 62-240823 10/1987
(Continued)

OTHER PUBLICATIONS

El Maadi et al., "Outdoor infrared video surveillance: A novel dynamic technique for the subtraction of a changing background of IR images", 2007, Infrared Physics & Technology, vol. 49, Iss: 3, 261-265.*
(Continued)

*Primary Examiner* — Katrina Fujita
(74) *Attorney, Agent, or Firm* — Renner, Otto, Boisselle & Sklar, LLP (57) ABSTRACT An object detection device includes an acquisition unit configured to acquire information indicating a temperature distribution, a storage unit configured to store background information indicating a temperature distribution when no target object exists, a detection unit configured to detect existence or absence of a target object, and an update unit configured to repeatedly update the background information. The update unit performs, with respect to a non-detection region, a first background updating process for the update of the background information based on the acquired information and performs, with respect to a detection region, a second background updating process for the update of the background information using a correction value.

4 Claims, 9 Drawing Sheets (51) Int. Cl.
   *G01S 3/783* (2006.01)
   *G01V 8/10* (2006.01)
   *G01V 9/00* (2006.01)

(52) U.S. Cl.
   CPC ............. *G06T7/0097* (2013.01); *G01V 8/10* (2013.01); *G01V 9/005* (2013.01); *G06K 2209/21* (2013.01); *G06T 2207/10048* (2013.01); *G06T 2207/20144* (2013.01); *G06T 2207/20224* (2013.01)

(56) References Cited

U.S. PATENT DOCUMENTS

| | | | | |
|---|---|---|---|---|
| 8,300,890 | B1 * | 10/2012 | Gaikwad et al. | 382/103 |
| 8,446,468 | B1 * | 5/2013 | Medioni et al. | 348/144 |
| 8,867,834 | B2 * | 10/2014 | Fujisaki et al. | 382/171 |
| 8,934,020 | B2 * | 1/2015 | Wang et al. | 348/164 |

FOREIGN PATENT DOCUMENTS

| | | |
|---|---|---|
| JP | 5-118916 | 5/1993 |
| JP | 8-94400 | 4/1996 |
| JP | 9-33662 | 2/1997 |
| JP | 9-62822 | 3/1997 |
| JP | 10-308939 | 11/1998 |
| JP | 2002-148354 | 5/2002 |
| JP | 2007-256219 | 10/2007 |
| JP | 2008-224396 | 9/2008 |

OTHER PUBLICATIONS

Eveland et al., "Tracking human faces in infrared video", 2003, Image and Vision Computing, vol. 21, Iss: 7, 579-590.*

St-Laurent et al., "Combination of Colour and Thermal Sensors for Enhanced Object Detection", Information Fusion, 2007 10th International Conference on, 1-8.*

Ulusoy et al. "New method for the fusion of complementary information from infrared and visual images for object detection", Feb. 2011, Image Processing, IET, vol. 5, Iss: 1, 36-48.*

International Search Report for corresponding International Application No. PCT/IB2012/000476 mailed Jun. 26, 2012.

Form PCT/ISA/237 for corresponding International Application No. PCT/IB2012/000476 dated Jun. 26, 2012.

Jun Nakata et al., "Real-time Calibration Method of MM-wave Image Using Upper-edge of Back-ground Temperature", 2009 Nen IEICE Electronics Society Taikai Koen Ronbunshu 1, Sep. 1, 2009, p. 143.

* cited by examiner

OBJECT DETECTION DEVICE

FIELD OF THE INVENTION

The present invention relates to an object detection device that detects a target object by finding a difference between a present thermal image and a background image through the use of a thermal image (an acquired image).

BACKGROUND OF THE INVENTION

There is conventionally available an object detection device that acquires a thermal image for a detection range from a sensor device and detects a heat source, i.e., a target object, such as a human or the like from the thermal image. As a method of detecting an object using an object detection device, there is known a background difference method of previously recording a thermal image for a detection range at the time when no target object exists in the detection range, as a background image, and detecting a difference between the present thermal image acquired from a sensor device and the background image. The background difference method has an advantage in that it enjoys simple calculation and high detection accuracy under a stable environment.

In an object detection device that makes use of the background difference method, if the background image recorded earlier is continuously used as it stands, there is likelihood that erroneous detection may occur when the temperature within a detection range (hereinafter referred to as an "ambient temperature") is changed by other causes than a target object. It is therefore necessary to update the background image.

In view of this, there has been proposed a device which has a function of updating a background image using an acquired image in case where a target object is not detected from the acquired image (see, e.g., Japanese Patent Application Publication No. 62-240823 (JP62-240823A)). Moreover, there has been proposed a device which has a function of acquiring a new image at a predetermined time after a previous background image is updated, calculating an arithmetic mean of the acquired image and the present background image and updating the background image to become a next background image (see, e.g., Japanese Patent Application Publication No. 10-308939 (JP10-308939A)). In the device disclosed in JP10-308939A, the step of calculating the arithmetic mean is not performed if a target object is detected from the acquired image.

In addition, as a device for identifying a human body from an image, there has been proposed a device which has a function of calculating a difference between a background image and a present acquired image, binarizing the difference with a threshold value and updating the background image with the present image with respect to the pixels which are equal to or smaller than the threshold value (see, e.g., Japanese Patent Application Publication No. 5-118916 (JP5-118916A)). The device disclosed in JP5-118916A further has a function of updating the background image with the present image with respect to the pixels which are not determined to be a human body even if the present image has the pixels which are larger than the threshold value (which are detected by the binarization).

In the configurations disclosed in JP62-240823A and JP10-308939A, however, the background image is not updated if the acquired image has a detected target object. For that reason, the update of the background image is not performed during the time when the target object continues to exist in a detection range. This makes it difficult to cope with a change in an ambient temperature. Thus, erroneous detection may possibly occur.

As in the device disclosed in JP5-118916A, even if the background image is updated with respect to the target object (human) non-detection region of an acquired image having a detected target object, the update of the background image is not performed with respect to the target object detection region of the acquired image. This makes it difficult to cope with a change in an ambient temperature. Thus, erroneous detection may possibly occur. For instance, if the ambient temperature goes down in a state that a human continues to exist in the same position, the body temperature of the human is also decreased along with the ambient temperature. However, the background image of the human-existing region is not updated. In this case, the difference between the human body temperature and the background image temperature is smaller than a threshold value. Thus, the object detection device may possibly make erroneous detection (issue an erroneous notice) that there exists no human. Conversely, if the ambient temperature goes up in a state that a human continues to exist in the same position, the temperature of the background image of the human-existing region becomes lower than the actual ambient temperature. Even if the human leaves the human-existing region, the object detection device may possibly make erroneous detection that the human still exists there.

SUMMARY OF THE INVENTION

In view of the above, the present invention provides an object detection device capable of coping with a change in an ambient temperature, thereby making erroneous detection less likely to occur.

In accordance with the present invention, there is provided an object detection device, including: an acquisition unit configured to acquire information indicating a temperature distribution within a detection range; a storage unit configured to store background information indicating a temperature distribution within the detection range when no target object exists in the detection range; a detection unit configured to detect existence or absence of a target object in the detection range, based on a change of the acquired information with respect to the background information; and an update unit configured to repeatedly update the background information stored in the storage unit, wherein the update unit divides the background information into a detection region including a region where the target object is detected by the detection unit and a non-detection region including a region other than the detection region, and the update unit performs, with respect to the non-detection region, a first background updating process for the update of the background information based on the acquired information and performs, with respect to the detection region, a second background updating process for the update of the background information using a correction value found from a variation of a temperature in an extraction region including at least a portion of the non-detection region, the variation of the temperature being calculated in the first background updating process.

In the object detection device, the update unit may preferably find the correction value from the variation of the temperature in the extraction region by using a portion of the non-detection region contiguous to the detection region as the extraction region.

In the object detection device, depending on a dispersion degree of the variation of the temperature in the non-detection region calculated by the first background updating process, the update unit may preferably switch a first mode in which the correction value is found from the variation of the temperature in the extraction region by using a portion of the non-detection region of the background information as the extraction region and a second mode in which the correction value is found from the variation of the temperature in the extraction region by using the entire non-detection region of the background information as the extraction region.

According to the present invention, with respect to the detection region, the update unit performs the second background updating process for the update of the background information using the correction value found from the temperature variation in the extraction region formed of at least a portion of the non-detection region. It is therefore possible to cope with the change in the ambient temperature, thereby making erroneous detection less likely to occur.

DETAILED DESCRIPTION OF THE EMBODIMENTS

Embodiments of the present invention will now be described with reference to the accompanying drawings which form a part hereof. Throughout the drawings, identical or similar parts will be designated by like reference symbols with no description made thereon.

First Embodiment

Figure 1:
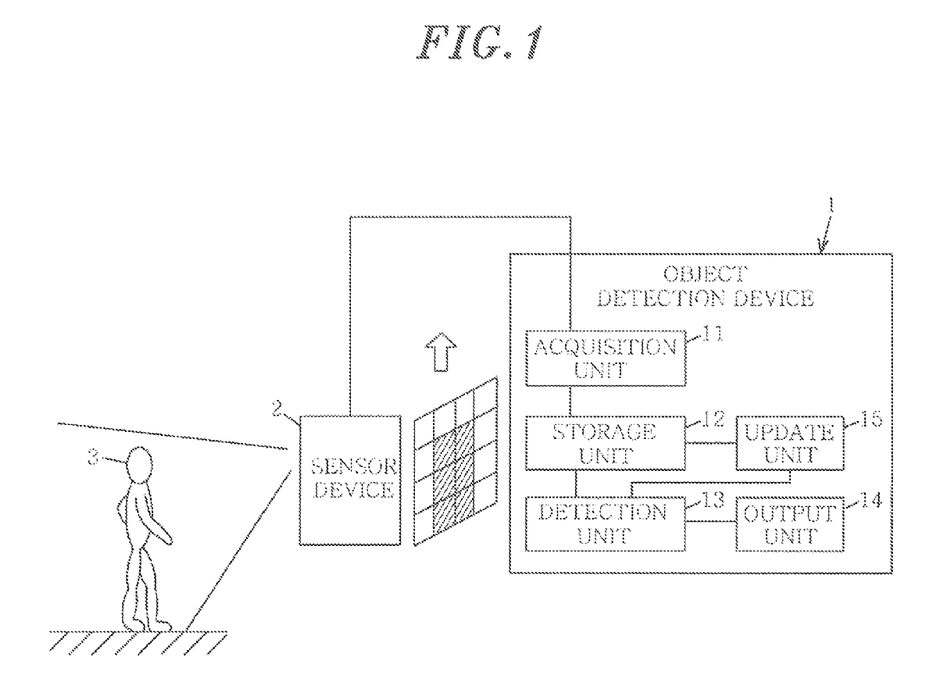
FIG. 1 is a schematic view showing the configuration of an object detection device according to a first embodiment.

As shown in FIG. 1, an object detection device 1 of the present embodiment includes an acquisition unit 11 configured to acquire information from a sensor device 2, a storage unit 12 configured to store the information, a detection unit 13 configured to detect existence or absence of a target object 3 by performing calculation of a background difference and an output unit 14 configured to output a detection result. While a human is used as the target object 3 in the present embodiment, the target object 3 is not limited to the human. The object detection device of the present embodiment can detect any target object serving as a heat source, e.g., a travelling motor vehicle.

The sensor device 2 includes sensor elements (not shown) sensitive to infrared rays, e.g., thermopile elements, which are two-dimensionally arranged in a matrix pattern. The sensor device 2 continuously outputs a two-dimensional thermal image (an acquired image) as a temperature distribution image, which is the information indicating a temperature distribution within a detection range (sensing range). The respective sensor elements correspond to the respective pixels of the thermal image. In the following description, the centigrade scales of the regions detected by the respective sensor elements will be referred to as pixel values of the corresponding pixels of the thermal image. While the object detection device 1 is independent of the sensor device 2 in the example shown in FIG. 1, the present invention is not limited to this configuration. The sensor device 2 may be unified with the object detection device 1.

The object detection device 1 of the present embodiment includes a computer which executes a specified program to realize the functions of the acquisition unit 11, the detection unit 13 and a update unit 15 to be described later. The output unit 14 includes a device having a function of presenting the detection result of the detection unit 13 to a user, such as a monitor device or a printer device.

In the object detection device 1, the acquisition unit 11 acquires from the sensor device 2 the acquired information (an acquired image) indicating a temperature distribution within a detection range. The detection unit 13 detects existence or absence of the target object 3 in the detection range, based on the change in the acquired information with respect to the background information (background image) stored in the storage unit 12. In the object detection device 1, a thermal image indicating the temperature distribution in the detection range at the moment when the target object 3 does not exist in the detection range is previously recorded as a background image in the storage unit 12. The object detection device 1 periodically acquires from the sensor device 2 an acquired image as a thermal image indicating the present temperature distribution in the detection range. The detection unit 13 detects the target object 3 by a background difference method for finding a difference between the acquired image and the background image.

If the background image acquired earlier is continuously used as it stands, the object detection device 1 may possibly make erroneous detection when the temperature within the detection range (hereinafter referred to as an "ambient temperature") is changed due to other causes than the target object 3, e.g., the change in time zones or the air conditioning.

In view of this, the object detection device 1 of the present embodiment includes the update unit 15 configured to repeatedly update the background image stored in the storage unit 12. In the present embodiment, the update unit 15 updates the background image each time when the detection unit 13 performs a process for detection of the target object 3 by comparing the acquired image and the background image. However, the present invention is not limited to this configuration. For example, the background image may be updated once for a specified number of detection processes. Moreover, the update unit 15 may update the background image, e.g., at predetermined timings.

Figure 2:
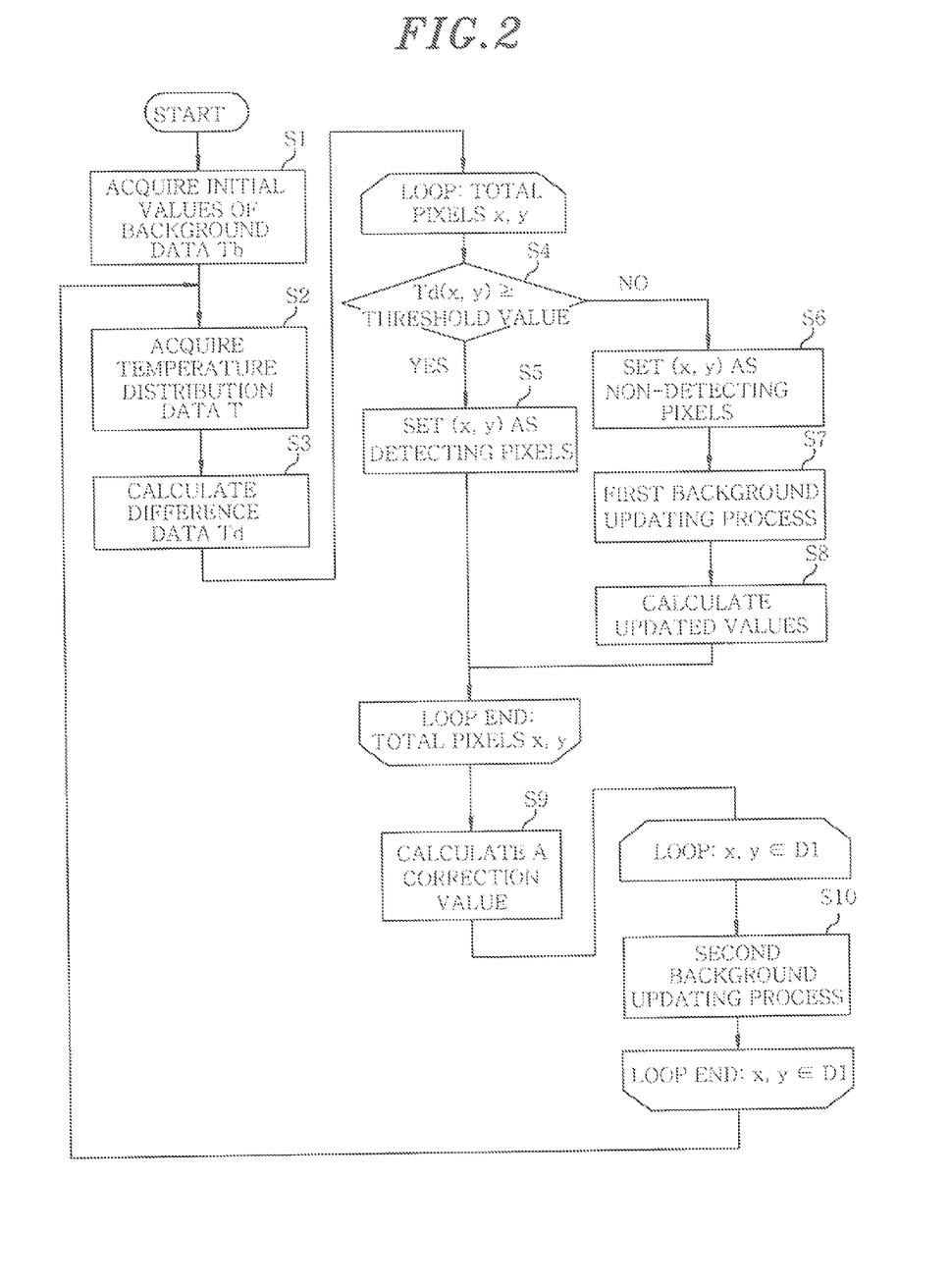
FIG. 2 is a flowchart illustrating the operation of the object detection device according to the first embodiment.

Next, the operation of the object detection device 1 will be described with reference to the flowchart shown in FIG. 2, with emphasis placed on the process for the detection of the target object 3 performed by the detection unit 13 and the process for the update of the background image performed by the update unit 15. FIGS. 3 to 5B illustrate processes performed by the object detection device 1, in which views a thermal image having 5×5 pixels is taken as an example. In the following description, the pixel values of the respective pixels of an image will be specified by the coordinate positions (x, y) of the respective pixels of the image and the time t.

In the object detection device 1, the acquisition unit 11 first acquires a thermal image outputted from the sensor device 2 in a state that the target object 3 does not exist. The respective pixel values of the thermal image are previously stored as initial values of background data Tb(x, y, t) in the storage unit 12 (S1). The background data Tb(x, y, t) are the pixel values of the respective pixels making up a background image Tb.

In the object detection device 1, the acquisition unit 11 acquires present temperature distribution data T(x, y, t) from the sensor device 2. The temperature distribution data T(x, y, t) are stored in the storage unit 12 (S2). The temperature distribution data T(x, y, t) are the pixel values of the respective pixels making up an acquired image T.

Figure 3:
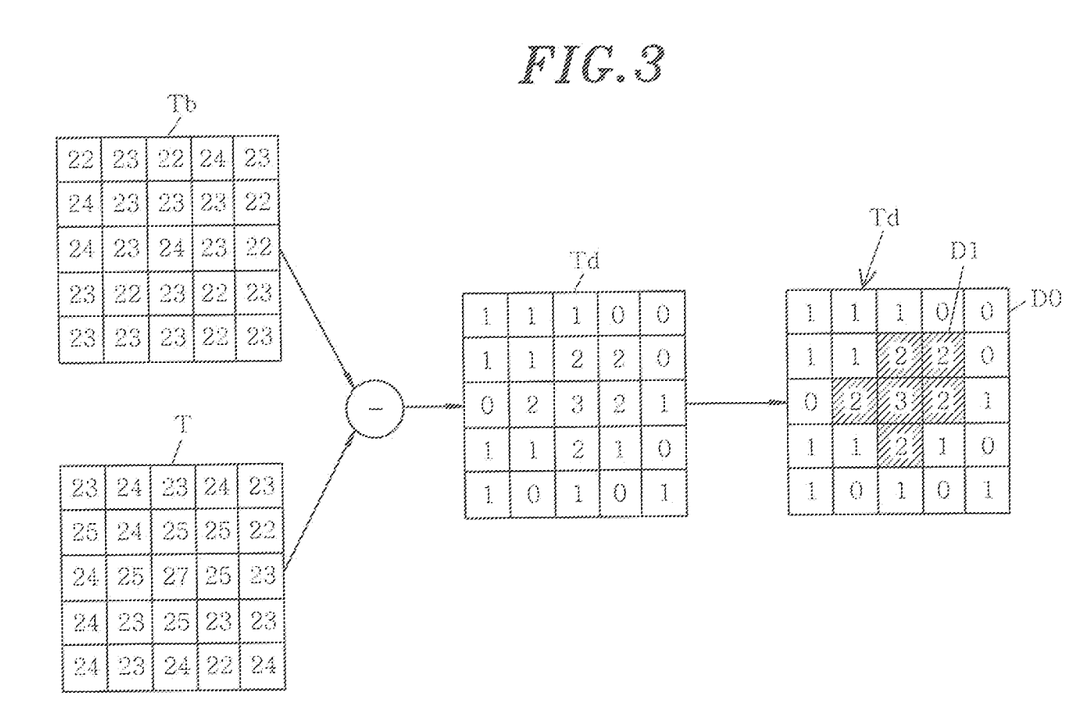
FIG. 3 is an explanatory view depicting the operation of the object detection device according to the first embodiment.

As illustrated in FIG. 3, the detection unit 13 calculates a difference between the background data Tb(x, y, t) stored in the storage unit 12 and the temperature distribution data T(x, y, t), thereby finding difference data Td(x, y, t) (S3). The difference data Td(x, y, t) is represented by Equation 1. The difference data Td(x, y, t) are the pixel values of the respective pixels making up a difference image Td. The detection unit 13 performs the calculation represented by Equation 1 with respect to all the pixels of the acquired image T on a pixel-by-pixel basis.

$$Td(x,y,t)=T(x,y,t)-Tb(x,y,t) \quad \text{(Equation 1)}$$

Figure 5A:
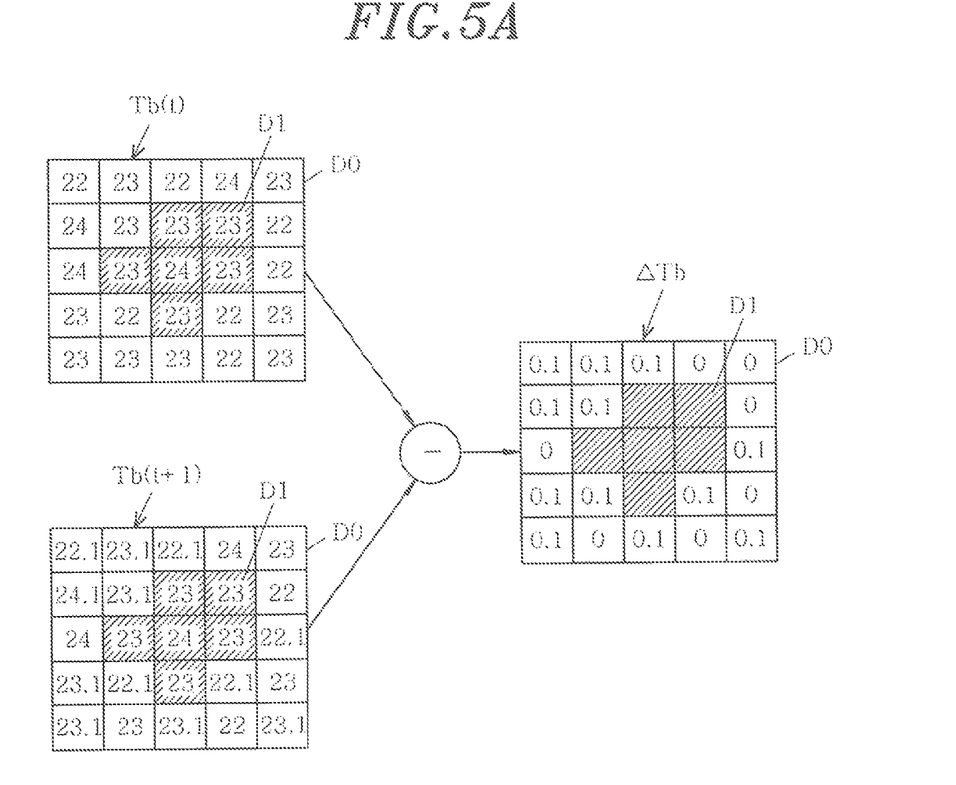
FIGS. 5A and 5B are explanatory views depicting the operation of the object detection device according to the first embodiment.

Then, the detection unit 13 binarizes the difference data Td(x, y, t) with a threshold value (S4). At this time, as illustrated in FIG. 3, the detection unit 13 generates a detected image I by performing binarization in such a way that the pixels having a difference value equal to or larger than the threshold value become "detecting pixels" by which the target object 3 is detected (S5) and the pixels having a difference value smaller than the threshold value become "non-detecting pixels" by which the target object 3 is not detected (S6). In the example shown in FIGS. 3 to 5B, the hatched region indicates a region composed of a set of the detecting pixels, namely a detection region D1 where the target object 3 is detected. The region other than the hatched region indicates a region composed of a set of the non-detecting pixels, namely a non-detection region D0 where the target object 3 is not detected. The pixel values I(x, y, t) of the respective pixels making up the detected image I are represented by Equation 2 through the use of a threshold value C.

$$I(x,y,t)=1 \text{ (when } Td(x,y,t) \geq C\text{) or 0 (otherwise)} \quad \text{(Equation 2)}$$

In other words, the pixels (x, y) are detecting pixels if I(x, y, t)=1. The pixels (x, y) are non-detecting pixels if I(x, y, t)=0. The detected image I is outputted from the output unit 14 as the detection result of the detection unit 13. In the present embodiment, the threshold value C is equal to 2.

Figure 4:
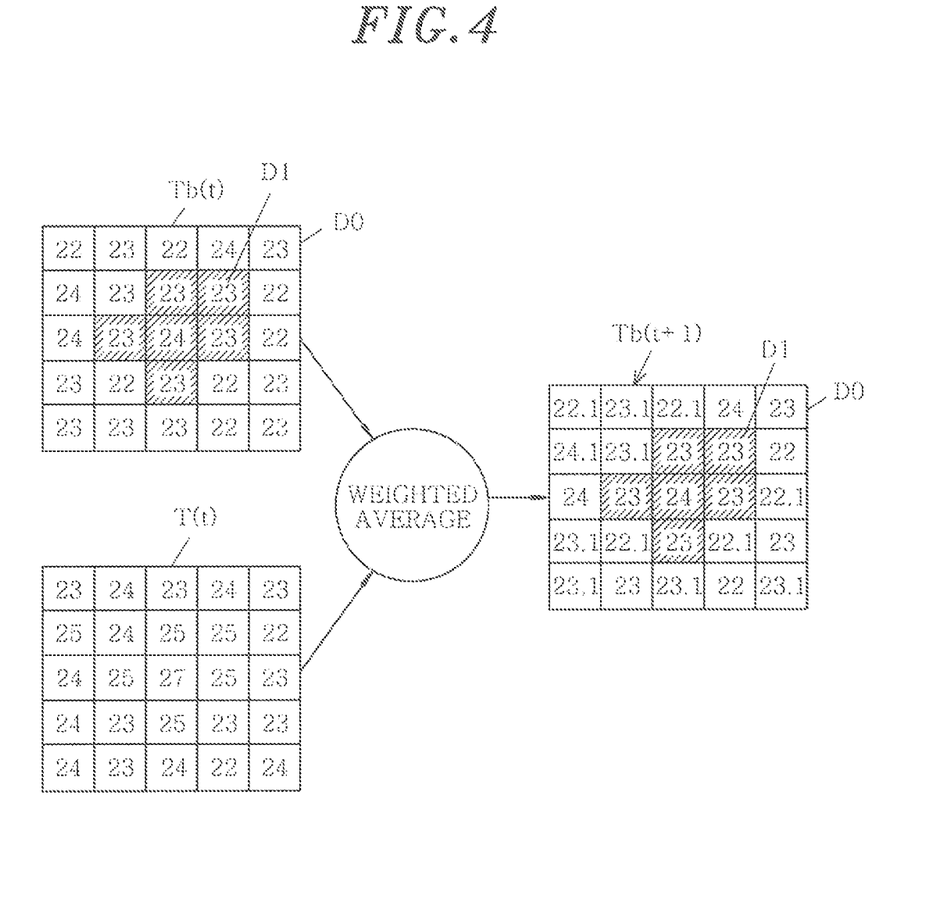
FIG. 4 is an explanatory view depicting the operation of the object detection device according to the first embodiment.

Next, the update unit 15 of the object detection device 1 performs a first background updating process for the update of the background data Tb(x, y, t) with respect to the non-detection region D0 composed of the set of the non-detecting pixels (S7). The update unit 15 performs the first background updating process by correcting the background data Tb(x, y, t) stored in the storage unit 12 with respect to all the pixels of the non-detection region D0, based on the latest temperature distribution data T(x, y, t). More specifically, as illustrated in FIG. 4, the update unit 15 performs the first background updating process by calculating weighted average values of the background data Tb(x, y, t) stored in the storage unit 12 and the present temperature distribution data T(x, y, t). In other words, the new background data TbD0(x, y, t+1) for the non-detection region D0 are represented by Equation 3 through the use of a weighted average parameter α. In the example shown in FIG. 4, the parameter α is equal to 0.1. The update unit 15 performs the calculation represented by Equation 3 with respect to all the pixels of the non-detection region D0 on a pixel-by-pixel basis.

$$TbD0(x,y,t+1)=(1-\alpha)TbD0(x,y,t)+\alpha TD0(x,y,t) \quad \text{(Equation 3)}$$

In Equation 3, TbD0(x, y, t) is the background data of the non-detection region D0, and TD0(x, y, t) is the present temperature distribution data of the non-detection region D0.

Using the new background data TbD0(x, y, t+1) for the non-detection region D0 obtained in the first background updating process, the update unit 15 finds a correction value to be used in a second background updating process which will be described later. The correction value is found from the temperature variation updated in the first background updating process over an extraction region composed of at least a portion of the non-detection region D0 of the background image Tb. In the present embodiment, the entire non-detection region D0 is used as the extraction region. As illustrated in FIG. 5A, the update unit 15 first finds updated values ΔTbD0(x, y, t) represented by Equation 4 with respect to all the pixels of the non-detection region D0 on a pixel-by-pixel basis (S8). In the background image Tb, the updated values ΔTbD0(x, y, t) are values indicating the variations of the pixel values of the non-detection region D0 updated by the first background updating process.

$$\Delta TbD0(x,y,t)=TbD0(x,y,t+1)-TbD0(x,y,t) \quad \text{(Equation 4)}$$

In Equation 4, TbD0(x, y, t) denotes the previous background data of the non-detection region D0.

Subsequently, the update unit 15 finds, as the correction value, a representative value of the updated values ΔTbD0(x, y, t) for all the pixels of the non-detection region D0 as the extraction region (S9). In the present embodiment, the correction value, i.e., the representative value of the updated values ΔTbD0(x, y, t), is an average value ΔTav represented by Equation 5. However, the representative value is not limited to the average value but may be a median value or a mode value. In Equation 5, the number of elements (the number of pixels) belonging to the non-detection region D0 is denoted by |D0|.

$$\Delta Tav = \frac{\sum_{x,y \in D0} \Delta TbD0(x, y, t)}{|D0|} \quad \text{(Equation 5)}$$

In the example shown in FIG. 5A, twelve pixels having an updated value ΔTbD0(x, y, t) equal to 0.1 exist in the non-detection region D0 composed of nineteen pixels. Thus, the average value ΔTav is 1.2/19, i.e., about 0.06.

Figure 5B:
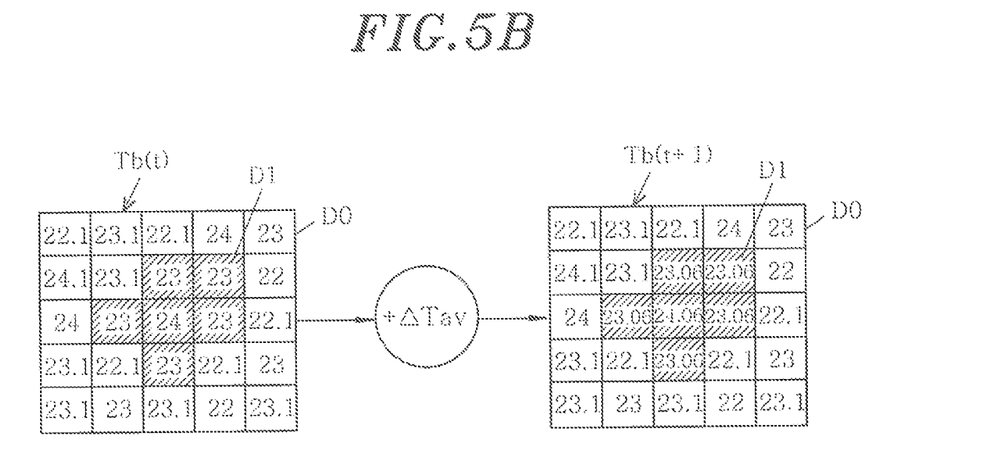

Then, the update unit 15 of the object detection device 1 performs a second background updating process by which the background data TbD1(x, y, t) are updated with respect to the detection region D1 composed of the set of the detecting pixels (S10). The update unit 15 performs the second background updating process by correcting the background data Tb(x, y, t) stored in the storage unit 12 (hereinafter referred to as TbD1(x, y, t)), with respect to all the pixels of the detection region D1, using the correction value (the average value ΔTav) found in step S9. More specifically, as illustrated in FIG. 5B, the update unit 15 performs the second background updating process by adding the correction value to the present background data TbD1(x, y, t) stored in the storage unit 12. In other words, the new background data TbD1(x, y, t+1) for the detection region D1 is represented by Equation 6. The update unit 15 performs the calculation represented by Equation 6 with respect to all the pixels of the detection region D1 on a pixel-by-pixel basis.

$$TbD1(x,y,t+1)=TbD1(x,y,t)+\Delta Tav \quad \text{(Equation 6)}$$

In short, the update unit 15 performs the first background updating process represented by Equation 3 with respect to the non-detection region D0 of the background data Tb(x, y, t) and performs the second background updating process represented by Equation 6 with respect to the detection region D1. The update unit 15 suitably updates the background image Tb stored in the storage unit 12 using the new background data Tb(x, y, t+1) obtained in this manner. As a result, the new background data Tb(x, y, t+1) updated with respect to all the pixels (all the pixels of the non-detection region D0 and the detection region D1) are stored as the background image Tb in the storage unit 12. If the target object 3 does not exist within the detection range of the sensor device 2, the difference image Td does not include the detection region D1 and the entire region of the difference image Td becomes the non-detection region D0. Accordingly, the entire region of the background image Tb is updated only by the first background updating process.

Thereafter, the object detection device 1 comes back to step S2 and repeatedly performs steps S2 through S10 using the updated background image Tb.

With the object detection device 1 of the present embodiment described above, even if the ambient temperature is changed while the target object 3 continues to exist in the same position, the update unit 15 can update the background image Tb pursuant to the change of the ambient temperature with respect to the detection region D1 where the target object 3 is detected. Accordingly, even if the target object 3 continues to exist in the same position for a long period of time, the background image Tb is correctly updated in conformity with the change of the ambient temperature. The object detection device 1 can correctly perform the subsequent process of detecting the target object 3 using the updated background image Tb.

In short, the update unit 15 updates the background image Tb with respect to not only the non-detection region D0 where the target object 3 is not detected but also the detection region D1 where the target object 3 is detected. It is therefore possible to enable the entire region of the background image Tb to cope with the change of the ambient temperature. For instance, even if the ambient temperature goes down while a human continues to exist in the same position, the background image Tb of the human-existing region is also updated pursuant to the change of the ambient temperature. It is therefore possible to prevent the object detection device 1 from making erroneous detection (issuing an erroneous notice) that there exists no human. In case where the ambient temperature goes up while a human continues to exist in the same position, it is possible to prevent the object detection device 1 from making erroneous detection that the human left the region still exists there.

Consequently, as compared with a configuration in which the detection region D1 of the background image Tb is not updated, the object detection device 1 of the present embodiment has an advantage in that it is possible to cope with the change of the ambient temperature, thereby making the erroneous detection hard to occur.

In the present embodiment, the detection region D1 is the set of the pixels (detecting pixels) having the difference data equal to or larger than the threshold value. However, the present invention is not limited to this example. It is preferable to appropriately expand the detection region D1. In other words, it is only necessary that the detection region D1 includes at least the entire region where the target object 3 is detected by the detection unit 13. However, the detection region D1 is not just limited to the region where the target object 3 is detected. Similarly, the non-detection region D0 is the region other than the detection region D1, and the non-detection region D0 is not just limited to the region where the target object 3 is not detected. That is to say, the non-detection region D0 may be narrower than the region where the target object 3 is not detected. By expanding the detection region D1, it is possible to solve the following problems.

If the pixel resolution of the sensor device 2 is low, it is sometimes the case that an averaged low pixel value (temperature) is outputted with respect to a pixel having an object-existing portion and an object-absent portion and the difference data thereof becomes smaller than the threshold value to be included in the non-detection region D0. In reality, the target object 3 exists in this pixel. For that reason, the detected temperature is higher than the actual ambient temperature even though the pixel value is smaller than the threshold value. Thus, with the object detection device 1 of the present embodiment, the background data are updated by the update unit 15 into a temperature higher than the actual ambient temperature. This may become a cause of erroneous detection.

In contrast, if the detection region D1 is expanded, the pixel having an object-existing portion and an object-absent portion is included in the detection region D1. It is therefore possible to prevent the background data from being updated by the pixel value of the pixel. Accordingly, it is possible to prevent the background data from being updated by the update unit 15 into a temperature higher than the actual ambient temperature.

Figure 6:
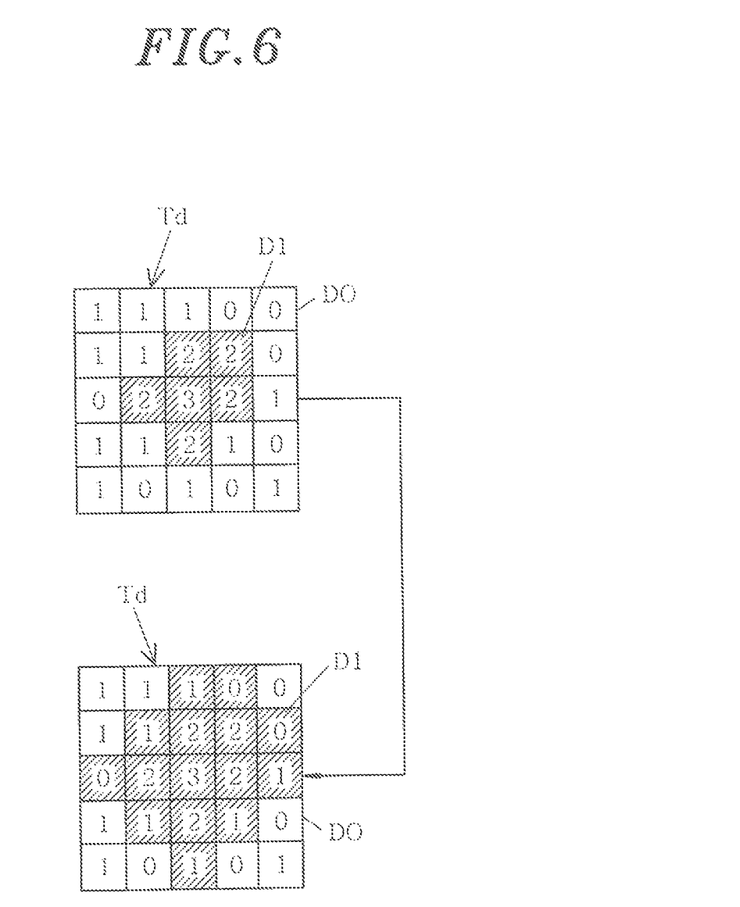
FIG. 6 is an explanatory view depicting the operation of an object detection device according to another configuration of the first embodiment.

More specifically, the expanding process of the detection region D1 is a dilation process performed with respect to the pixels having the pixel value I(x, y, t) equal to 1 in the detected image I generated by the processes of steps S4 through S6. Thus, as shown in FIG. 6, the detection region D1 of the difference image Td is expanded not only to the set of the pixels (detecting pixels) having the difference data Td(x, y, t) equal to or larger than the threshold value but also to the vicinities thereof. The dilation process referred to herein is a generally available image processing technology by which the border line of a cluster of pixels having the same value and connected to one another is expanded outward by an amount of one pixel. By performing the dilation process, the pixel having an object-existing portion and an object-absent portion can be included in the detection region D1.

Figure 7:
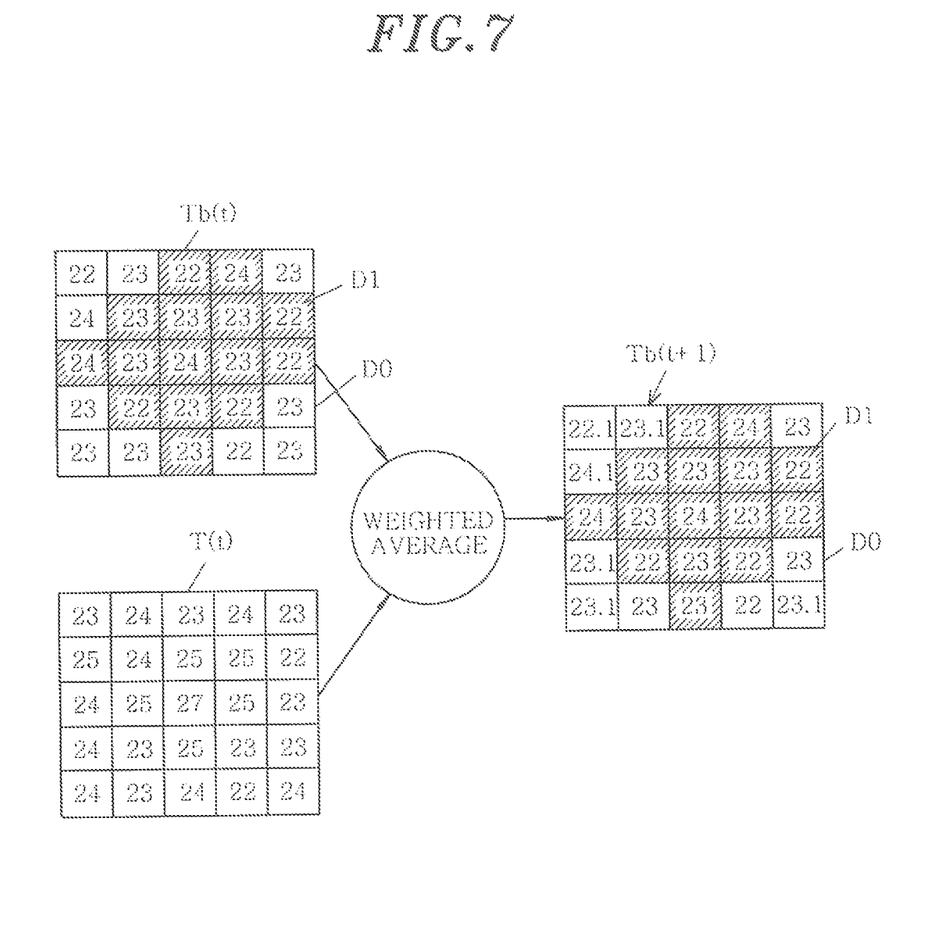
FIG. 7 is an explanatory view depicting the operation of an object detection device according to a further configuration of the first embodiment.
Figure 8A:
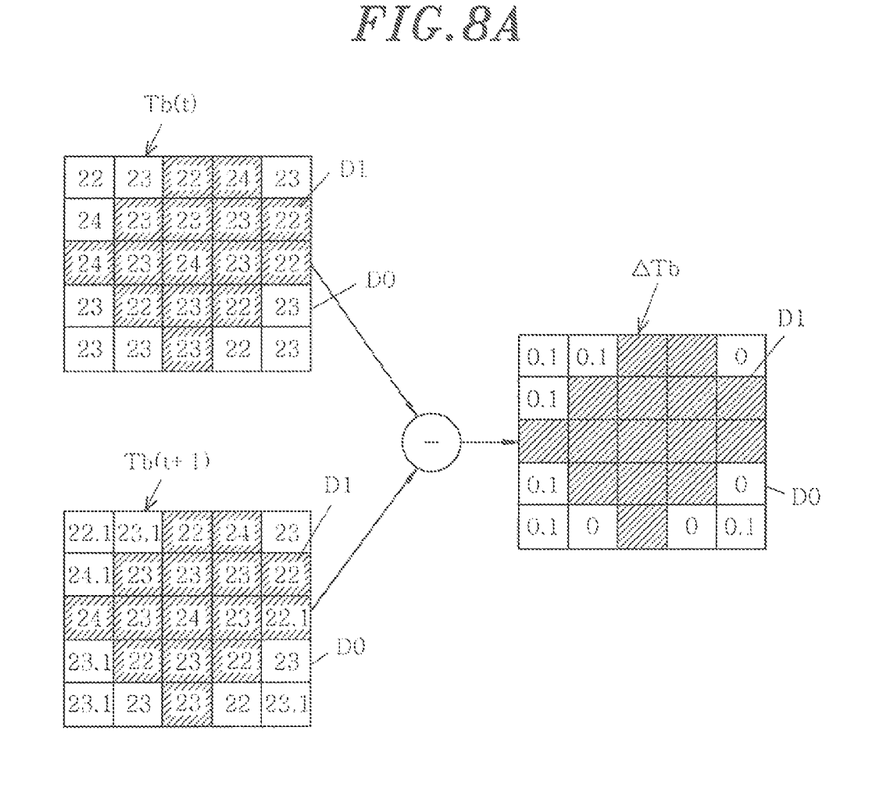
FIGS. 8A and 8B are explanatory views depicting the operation of an object detection device according to a still further configuration of the first embodiment.
Figure 8B:
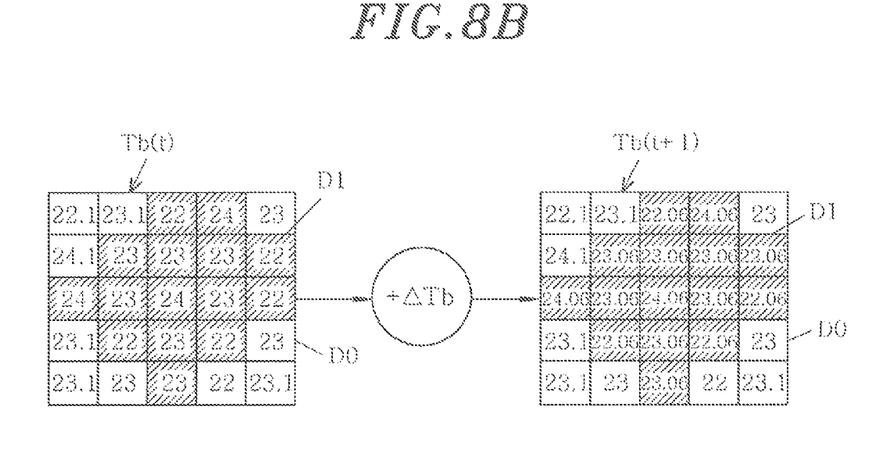

After performing the expanding process of the detection region D1, as illustrated in FIGS. 7 to 8B, the object detection device 1 performs the first background updating process and the second background updating process (the processes of steps S7 through S10) by using the region other than the detection region D1 as the non-detection region D0. In the example shown in FIGS. 6 to 8B, the hatched region indicates the detection region D1. The region other than the hatched region indicates the non-detection region D0.

Second Embodiment

The object detection device 1 of the present embodiment differs from the object detection device 1 of the first embodiment in terms of the setting of the extraction region used in finding the correction value for the second background updating process. In the following description, the same configurations as those of the first embodiment will be designated by like reference symbols with the description thereon appropriately omitted.

In the object detection device 1 of the first embodiment described earlier, the entire non-detection region D0 is used as the extraction region. The update unit uses the representative value of the updated values ΔTbD0(x, y, t) of the total pixels of the non-detection region D0 as the correction value for the second background updating process. For that reason, the detection range of the sensor device 2 becomes wide. If a deflection exists in the change of the ambient temperature within the detection range, the following problems may occur. For example, if a heat source other than the target object 3, such as a stove or the like, exists in a position spaced apart from the target object (human) 3, the temperature around the heat source, which has nothing to do with the actual ambient temperature of the detection region D1, may sometimes affect the correction value for the second background updating process. Thus, there may be a case that the background data of the detection region D1 are updated into a temperature higher than the actual ambient temperature.

In the present embodiment, however, the update unit 15 uses only a portion of the non-detection region D0 contiguous to the detection region D1 as the extraction region. In other words, the update unit 15 calculates, as the correction value, a representative value (e.g., the average value ΔTav) of the updated values ΔTb(x, y, t) of the pixels of the non-detection region D0 adjacent to the detection region D1 and performs the second background updating process using the correction value. More specifically, the update unit 15 performs dilation processes n times (where n=1, 2, etc.) with respect to the detected image I. The update unit 15 uses the difference region between the post-dilation region and the pre-dilation detection region D1 as the extraction region. The update unit 15 finds the representative value (the correction value) of the updated values ΔTb(x, y, t) using only the pixels existing within the extraction region. In this regard, the n is a parameter defining the breadth (width) of the extraction region. The n may be set depending on the detection range and pixel resolution of the sensor device 2.

With the object detection device 1 of the present embodiment, only a portion of the non-detection region D0 contiguous to the detection region D1 is used as the extraction region. Therefore, even if a deflection exists in the change of the ambient temperature within the detection range, it is possible to calculate an appropriate value as the correction value for the second background updating process. In other words, by virtue of the second background updating process using the correction value, the background data of the detection region D1 where the target object 3 is detected are updated through the use of the change of the ambient temperature near the target object 3. For that reason, the background data are corrected into a more reliable value. Therefore, even if a deflection exists in the change of the ambient temperature within the detection range, it is possible to prevent the background data of the detection region D1 from being updated into a temperature higher than the actual ambient temperature in the second background updating process. This configuration is particularly useful in a case where a deflection is likely to occur in the change of the ambient temperature within the detection range, e.g., in a case where the detection range of the sensor device 2 is wide.

Figure 9:
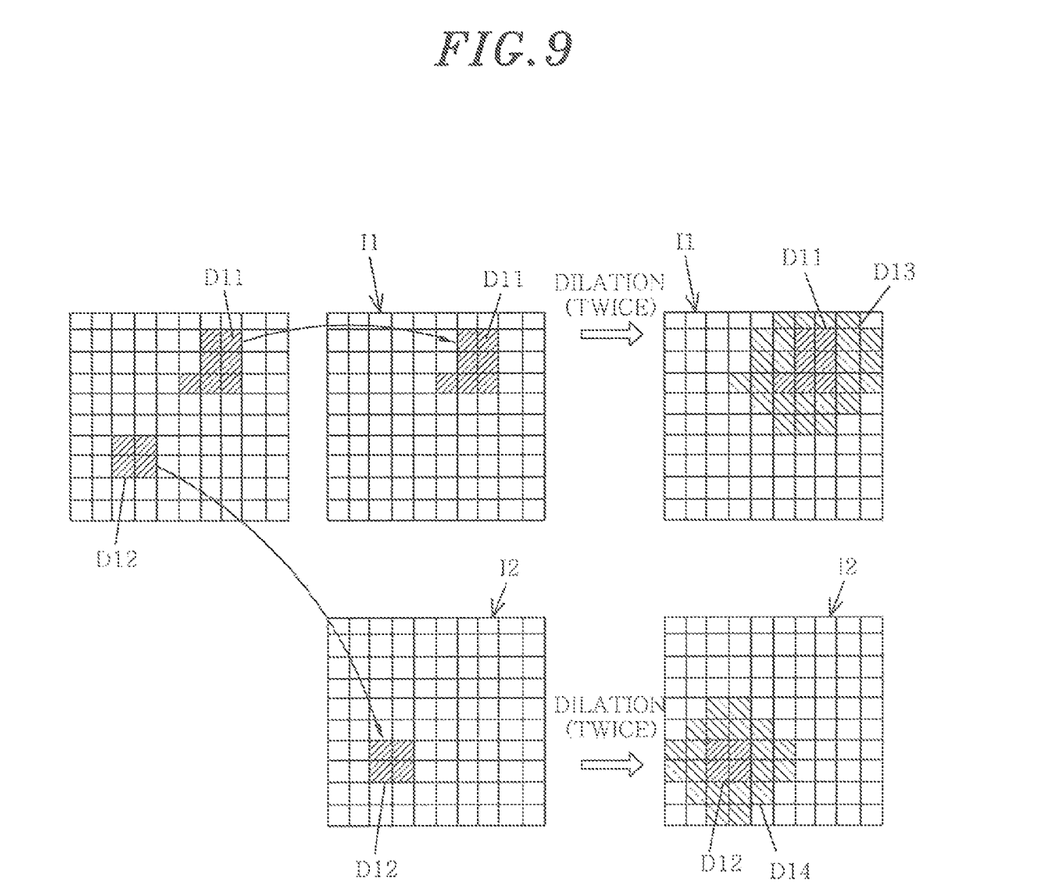
FIG. 9 is an explanatory view depicting the operation of an object detection device according to a second embodiment.

As illustrated in FIG. 9, if there exists a plurality of clusters of the detecting pixels connected to one another, the update unit 15 may temporarily generate, on a cluster-by-cluster basis, detected images Im (where m=1, 2, etc.) composed of each of the clusters alone and may individually set an extraction region with respect to each of the detected images Im. In other words, the update unit 15 generates the detected images Im just as much as the number of the clusters of the detecting pixels and performs dilation processes n times (twice in FIG. 9) with respect to each of the detected images Im. The difference regions between the post-dilation regions and the pre-dilation detection regions D11 and D12 are used as extraction regions D13 and D14. In FIG. 9, the detection regions D11 and D12, i.e., the clusters of the detecting pixels, and the extraction regions D13 and D14 for use in the calculation of the correction value are distinguished from each other by the directions of hatching lines.

In this case, the update unit 15 calculates correction values for the respective extraction regions D13 and D14 and updates the background data of the respective detection regions D11 and D12 using the correction values. In the example shown in FIG. 9, the correction value calculated from the extraction region D13 of the detected image I1 is used in updating the background data of the detection region D11 of the detected image I1. The correction value calculated from the extraction region D14 of the detected image I2 is used in updating the background data of the detection region D12 of the detected image I2.

In the present embodiment, the dilation process of an image processing technology is just used as a method of deciding the extraction region. Depending on the arrangement of the sensor device 2, the pixels adjoining the detecting pixels may not exist near the target object 3 in an actual space. If such arrangement of the sensor device 2 is known in advance, e.g., if the sensor device 2 is arranged to be directed obliquely downward, the update unit 15 may use, as the extraction region, only the pixels region adjacent to the detecting pixels existing in a region where the target object 3 makes contact with a floor surface.

Other configurations and functions remain the same as those of the first embodiment.

Third Embodiment

The object detection device 1 of the present embodiment differs from the object detection device 1 of the second embodiment in terms of the setting of the extraction region used in finding the correction value for the second background updating process. In the following description, the same configurations as those of the second embodiment will be designated by like reference symbols with the description thereon appropriately omitted.

In the present embodiment, the update unit 15 is capable of switching two operation modes, a first mode in which only a portion of the non-detection region D0 contiguous to the detection region D1 is used as the extraction region and a second mode in which the entire non-detection region D0 is used as the extraction region. The update unit 15 switches the first mode and the second mode depending on the dispersion degree of the variations of the temperature in the non-detection region D0 calculated by the first background updating process.

More specifically, the update unit 15 determines whether the updated values ΔTbD0(x, y, t) calculated by the first background updating process are substantially uniform with respect to all the pixels of the non-detection region D0. If not uniform, the update unit 15 operates in the first mode. If uniform, the update unit 15 operates in the second mode. In this regard, the update unit 15 compares, e.g., the difference value between the maximum value and the minimum value of the updated values ΔTbD0(x, y, t) of the non-detection region D0 with a threshold value. If the difference value is smaller than the threshold value, the update unit 15 determines that the updated values $\Delta TbD0(x, y, t)$ are substantially uniform. If the difference value is equal to or larger than the threshold value, the update unit 15 determines that the updated values $\Delta TbD0(x, y, t)$ are not uniform. Alternatively, the update unit 15 may find, e.g., a standard deviation of the updated values $\Delta TbD0(x, y, t)$ and may determine the substantial uniformity of the updated values $\Delta TbD0(x, y, t)$ by determining whether the standard deviation falls within a range of a threshold value.

With the object detection device 1 of the present embodiment described above, the extraction region as a target for the calculation of the correction value is changed depending on the dispersion degree of the variations of the temperature of the non-detection region D0. This enables the update unit 15 to calculate the correction value in an optimized manner.

In other words, the first mode, in which a portion of the non-detection region D0 contiguous to the detection region D1 is used as the extraction region, is effective when there is a deflection in the change of the ambient temperature within the detection range. In the first mode, however, there is a possibility that the correction value may be dispersed due to the reduction in the number of the pixels serving as calculation targets or a possibility that the calculation load may be increased due to the dilation process. On the other hand, the second mode, in which the entire non-detection region D0 is used as the extraction region, is not suitable if there is a deflection in the change of the ambient temperature within the detection range. However, the second mode has an advantage of not generating the dispersion of the correction value which may be caused by the reduction in the number of the pixels serving as calculation targets, or the increase of the calculation load which may be caused by the dilation process. The update unit 15 of the present embodiment switches the first mode and the second mode depending on the dispersion degree of the variations of the temperature in the non-detection region D0. Thus, the update unit 15 can always calculate the correction value in an optimized manner.

The region used as the extraction region by the update unit 15 in the first mode is not limited to a portion of the non-detection region D0 contiguous to the detection region D1. It is only necessary that the region used as the extraction region by the update unit 15 in the first mode is a portion of the non-detection region D0.

Other configurations and functions remain the same as those of the second embodiment.

While the embodiments of the present invention have been described above, the present invention is not limited to these specific embodiments. Different changes and modifications may be made without departing from the scope of the appended claims. Such changes and modifications shall be construed to fall within the scope of the present invention.

What is claimed is:

1. An object detection device, comprising:
   an acquisition unit configured to acquire information indicating a temperature distribution within a detection range;
   a storage unit configured to store background information indicating a temperature distribution within the detection range when no target object exists in the detection range;
   a detection unit configured to detect existence or absence of a target object in the detection range, based on a change of the acquired information with respect to the background information; and
   an update unit configured to repeatedly update the background information stored in the storage unit,
   wherein the update unit divides the background information into a detection region including a region where the target object is detected by the detection unit and a non-detection region including a region other than the detection region, and
   the update unit performs, with respect to the non-detection region, a first background updating process for the update of the background information based on the acquired information and performs, with respect to the detection region, a second background updating process for the update of the background information using a correction value found from a variation of a temperature in an extraction region including at least a portion of the non-detection region, the variation of the temperature being calculated in the first background updating process.

2. The device of claim 1, wherein the update unit finds the correction value from the variation of the temperature in the extraction region by using a portion of the non-detection region contiguous to the detection region as the extraction region.

3. The device of claim 2, wherein, depending on a dispersion degree of the variation of the temperature in the non-detection region calculated by the first background updating process, the update unit switches a first mode in which the correction value is found from the variation of the temperature in the extraction region by using a portion of the non-detection region of the background information as the extraction region and a second mode in which the correction value is found from the variation of the temperature in the extraction region by using the entire non-detection region of the background information as the extraction region.

4. The device of claim 1, wherein, depending on a dispersion degree of the variation of the temperature in the non-detection region calculated by the first background updating process, the update unit switches a first mode in which the correction value is found from the variation of the temperature in the extraction region by using a portion of the non-detection region of the background information as the extraction region and a second mode in which the correction value is found from the variation of the temperature in the extraction region by using the entire non-detection region of the background information as the extraction region.

* * * * *